United States Patent [19]
Kitamura

[11] Patent Number: 4,976,019
[45] Date of Patent: Dec. 11, 1990

[54] MACHINING CENTER

[75] Inventor: Koichiro Kitamura, Takaoka, Japan

[73] Assignee: Kitamura Machinery Co. Ltd., Tokyo, Japan

[21] Appl. No.: 397,421

[22] PCT Filed: Mar. 10, 1988

[86] PCT No.: PCT/JP88/00248
§ 371 Date: Aug. 15, 1989
§ 102(e) Date: Aug. 15, 1989

[87] PCT Pub. No.: WO88/06947
PCT Pub. Date: Sep. 22, 1988

[30] Foreign Application Priority Data
Mar. 13, 1987 [JP] Japan .................. 62-56431

[51] Int. Cl.$^5$ ............................. B23Q 17/20
[52] U.S. Cl. ................ 29/26 A; 33/DIG. 21; 356/358; 409/133
[58] Field of Search .......... 29/26 A, 568; 409/133, 409/204, 218; 33/DIG. 21; 356/358

[56] References Cited
U.S. PATENT DOCUMENTS

| 3,661,463 | 5/1972 | Brainard et al. | 356/363 |
| 3,756,722 | 9/1973 | Wetzel | 356/358 |
| 4,349,946 | 9/1982 | McMurtry | 279/16 |
| 4,628,441 | 12/1986 | Johnstone et al. | 364/167 |
| 4,688,307 | 8/1987 | Schneider et al. | 29/26 A |
| 4,706,372 | 11/1987 | Ferrero et al. | 29/568 |
| 4,742,609 | 5/1988 | Neumann | 29/26 A |
| 4,774,753 | 10/1988 | Holy et al. | 29/568 |
| 4,784,539 | 11/1988 | Lehmkuhl | 409/80 |

FOREIGN PATENT DOCUMENTS

| 58-114843 | 8/1983 | Japan . | |
| 60-79209 | 7/1985 | Japan . | |
| 213468 | 10/1985 | Japan | 29/568 |

Primary Examiner—Daniel W. Howell
Attorney, Agent, or Firm—Ronald P. Kananen

[57] ABSTRACT

This invention relates to a machining center including a machine tool and a three-dimensional measuring machine. The machining center machines a workpiece and then measures the shape of the machined workpiece. The measuring machine includes a probe unit for measuring the shape of the machined workpiece on a table of the machining center. For effecting measurement, relative motion between the probe unit and the machined workpiece is achieved by the first to third drive means.

12 Claims, 6 Drawing Sheets

MACHINING CENTER

CROSS REFERENCE TO RELATED APPLICATION

This application is related to copending and commonly assigned application Ser. No. 07/397,416, filed on Aug. 15, 1989, entitled A METHOD FOR MEASURING THE SHAPE OF A MACHINED WORKPIECE by Koichiro Kitamura which is being filed concurrently herewith.

BACKGROUND OF THE INVENTION

1. TECHNICAL FIELD

This invention relates to a machining center.

2. BACKGROUND ART

A machining center is provided with a plurality of tools and a variety of machining operations can be carried out by them after setting a workpiece on a table of the machining center. In the case of measuring the geometrical shape of a machined workpiece, the machined workpiece is removed from the table of the machining center and then fixed on a table of a three-dimensional measuring machine which is remote from the machining center. After that, a probe unit of the three-dimensional measuring machine comes into contact with the machined workpiece so as to measure its geometrical shape.

However, since the machined workpiece must be removed from the machining center table and then set on the table of the three-dimensional measuring machine, the measuring operation is troublesome and long. In addition, a large floor space is required to accommodate the machining center and the three-dimensional measuring machine.

SUMMARY OF THE INVENTION

It is an object of this invention to solve the aforenoted problems by providing a machining center in which the geometrical shape of a machined workpiece can be efficiently measured without resetting the machined workpiece on a three-dimensional measuring machine. Accordingly, the improved machining center can be used in a smaller floor space than previous approaches.

A machining center according to his invention has a plurality of tools, for example, an endmill and a plurality of drills. A workpiece can be set on a table of the machining center.

The machining center comprises a first drive means including a servomotor, a second drive means including a servomotor and a third drive means including a servomotor. The first drive means provides relative motion along an x-axis between one tool, for example an endmill, selected from a plurality of tools and the workpiece on the table. The second drive means provides relative motion along the Y-axis, perpendicular to the X-axis, between the one tool selected from the plurality of tools and the workpiece on the table. In addition, the third drive means provides for relative motion along a Z-axis perpendicular to both the X and Y axes, between one tool selected from the plurality of tools and the workpiece on the table.

Included in the machining center is a linear or length measuring machine, such as a laser length measuring machine. The length measuring machine measures the distances of linear relative motion between the selected tool and the workpiece on the table along X, Y and Z axes, respectively.

The machining center according to this invention further comprises a probe unit. The probe unit is used for measuring the geometrical shape of the workpiece on the table. The first drive means provides relative motion between the probe unit and the workpiece on the table along the X-axis. The second drive means provides relative motion between the probe unit and the workpiece along the Y-axis. In addition, the third drive means provides relative motion between the probe unit and the workpiece along the Z-axis. In addition, the length measuring machine measures the distances of relative motion between the probe unit and the workpiece on the table along the X, Y and Z axes, respectively.

According to this invention, the tool selected, such as an endmill, machines the workpiece on the table. The machining operation of the workpiece is carried out by rotating the endmill and operating the first to third drive means in a conventional manner.

After machining the workpiece, the geometrical shape of the machined workpiece can be efficiently measured without resetting the machined workpiece on a separate measuring machine. The probe unit accurately measures the geometrical shape of the machined workpiece set on the table by operating the aforenoted first to third drive means. In addition, both the machining operation and the measuring operation are carried out by using only one machining center. Accordingly, a smaller floor space can be used because a separate three-dimensional measuring machine is not required.

DETAILED DESCRIPTION OF THE INVENTION

Figure 1:
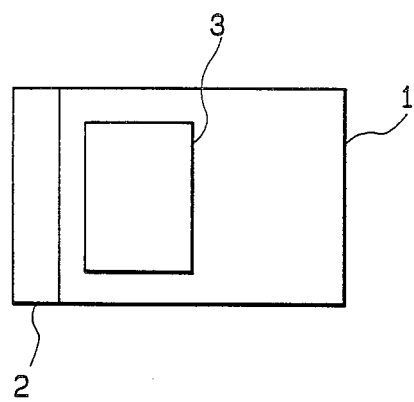
FIG. 1 shows a schematic view of this invention.

FIG. 1 schematically shows a machining center 1 according to this invention. The machining center 1 comprises a CNC unit 2 and a probe unit 3.

Figure 2:
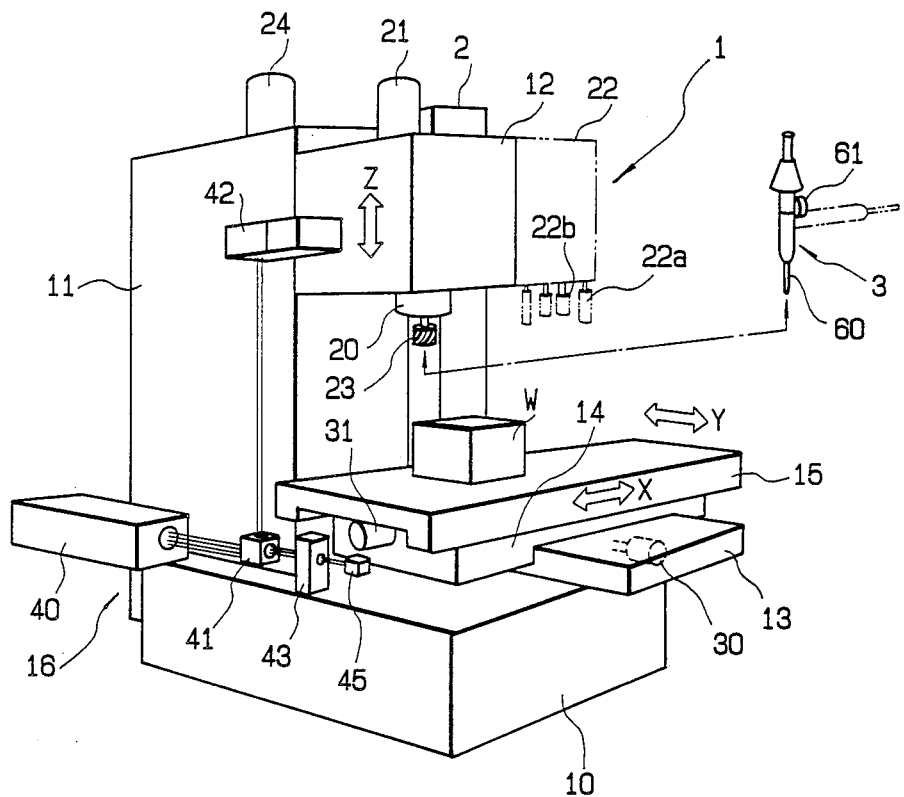
FIG. 2 is a perspective view showing an embodiment of a machining center according to this invention.

Referring now to FIG. 2, the machining center in FIG. 2 comprises a base 10, a column 11, the CNC unit 2, a spindlehead 12, saddles 13, 14, a table 15 and a laser length measuring apparatus generally indicated by reference numeral 16.

The spindlehead 12 has a spindle 20, a main motor 21, an automatic tool changer 22. The probe unit 3 can be detachably mounted in a spindlehead 12, for example, in a conventional manner such as a collet-chuck. An endmill 23, for example, is detachably mounted in the spindle 20. The endmill 23 has a holder 23a (see FIG. 3). The probe unit 3 has a holder 3a. Each of the holders can be detachably mounted in the spindle 20. The endmill 23 can be exchanged for a tool, such as a tool 22a set in the automatic tool changer 22 in a conventional manner. The probe unit 3 is substantially the same type of probe unit used in a conventional three-dimensional length measuring machine. But the probe unit 3 is provided with an actuator 61 for its attitude control. By operating the actuator 61, the probe 60 can rotate at a predetermined angle as shown by a dashed line.

The column 11 is provided with a servomotor 24. A laser head 40 and a polarization beam splitter 41 of the laser length measuring machine 16 are fixed to a side of the column 11. Also, a corner cube 42 is fixed to the spindlehead 12.

The saddle 13 is fixed on the base 10. The saddle 14 is slidably supported o the saddle 13. The table 15 is slidably supported on the saddle 14. A servomotor 30 is equipped within the saddle 13. The saddle 14 is provided with a servomotor 31. A workpiece W is detachably fixed on the table 15.

Figure 3:
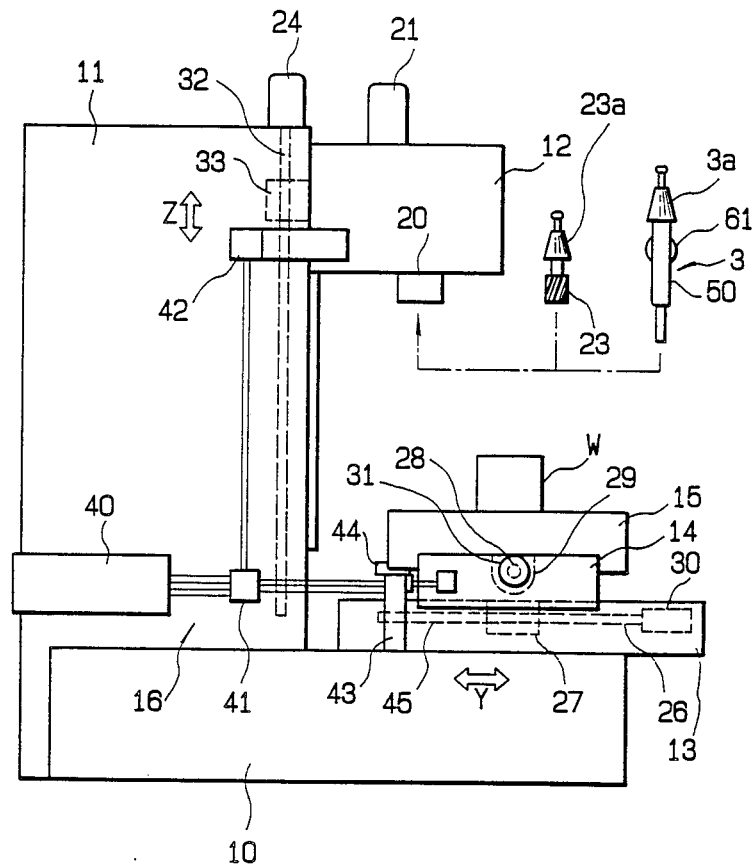
FIG. 3 is a side elevational view showing the embodiment.

Referring to FIG. 3, a feed screw 32 is connected with respect to a servomotor 24. A nut 33 fixed to the spindlehead 12 engages the feed screw 32. Therefore, the spindlehead 12 can be moved in the direction of arrow Z by the servomotor 24. In addition, a feed screw 26 is connected with respect to a servomotor 30. A nut 27 fixed to the saddle 14 engages the feed screw 26. Therefore, the saddle 14 can be moved in the Y direction by the servomotor 30. Furthermore, a feed screw 28 is connected with respect to a servomotor 3!. A nut 29 fixed to the table 15 engages the feed screw 28. Therefore, the table 15 can be moved in the X direction (see FIG. 2) by the servomotor 31.

Figure 4:
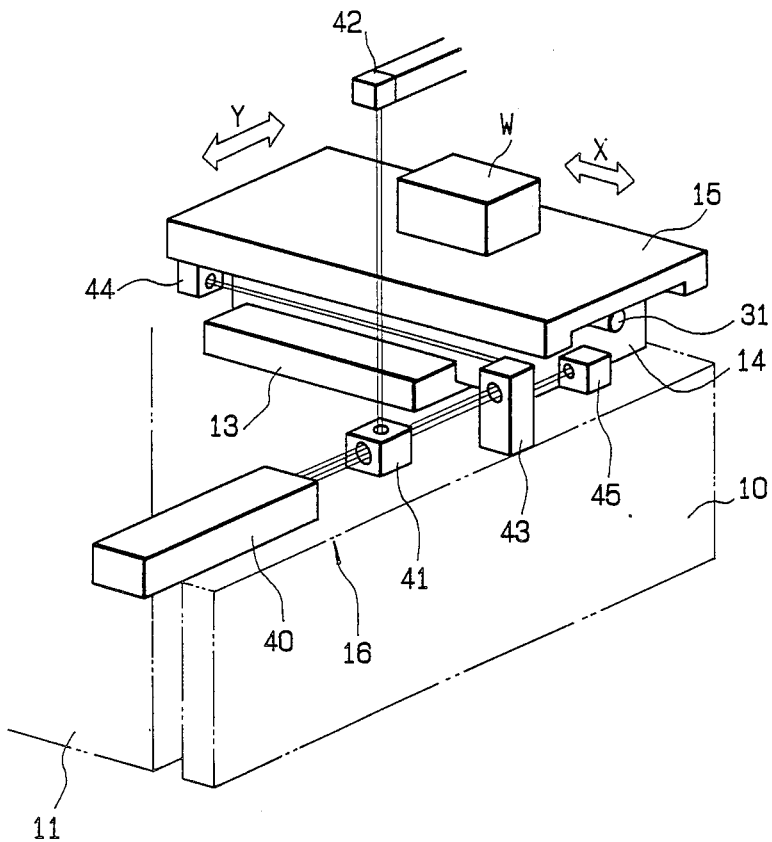
FIG. 4 is a perspective view showing a table and a laser length measuring machine.

Referring to FIG. 4, a beam splitter 43 is fixed on the base 10. A corner cube 45 is fixed to the saddle 14. A corner cube 44 is fixed to the table 15.

Figure 5:
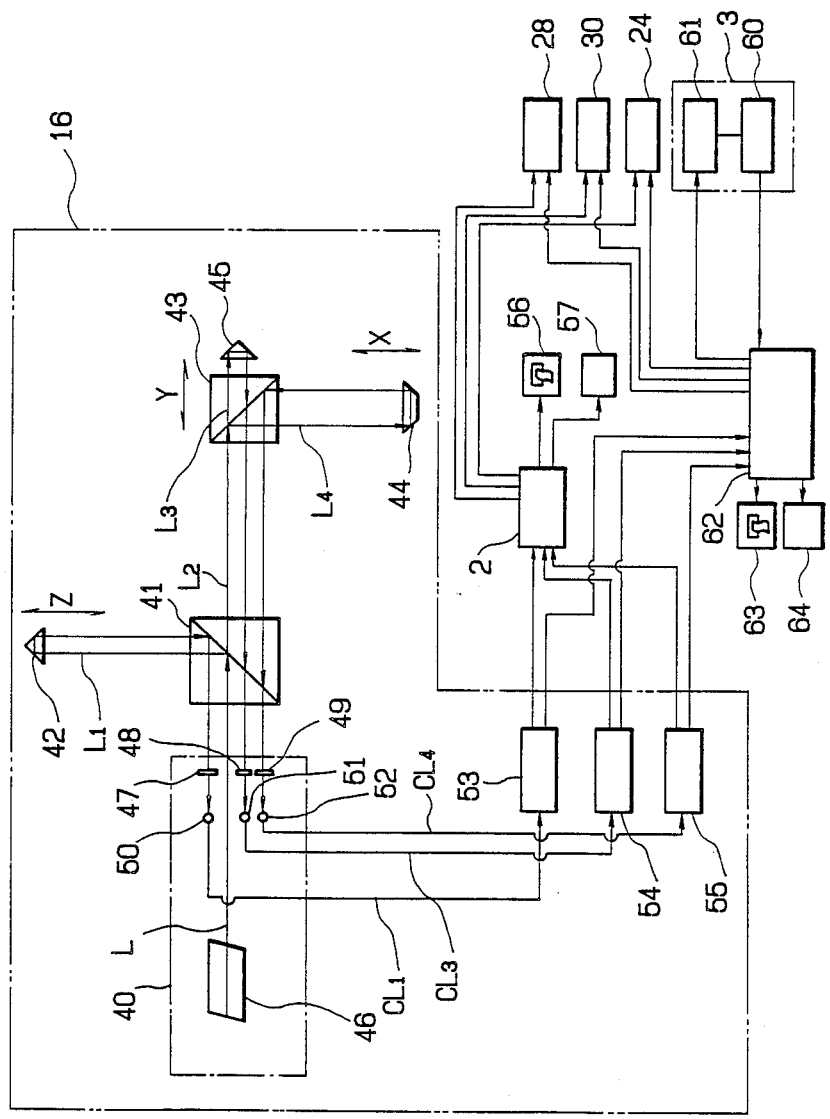
FIG. 5 shows a schematic block diagram view including the laser length measuring machine and a probe unit.

Referring to FIG. 5, the laser length measuring apparatus 16 has the laserhead 40, the polarization beam splitter 41, the corner cubes 42, 44, 45, the beam splitter 43 and counters 53 to 55. The counters 53 to 55 are connected to both the CNC unit 2 and a data processing unit 62. That is, the counts of the counters 53–55 are converted into the distances along the X, Y, and Z directions, respectively, which are sent to the CNC unit 2 and the data processing unit 62.

The laserhead 40 has a laser light source 46, polarization plates 47 to 49 and photodetectors 50 to 52. The laser light source 46 is preferably a He-Ne laser and, in this embodiment it is a single-frequency mode oscillation type laser. A laser beam L from the laser light source 46 is split by the polarization beam splitter 41 into two laser beams L1 and L2. The laser beam L1 is reflected from both the cube 42 and the polarization beam splitter 41 through the polarizing plate 47 to the photodetector 50. The laser beam 12 is split into laser beams L3 and L4 by the beam splitter 43. The laser beam L3 is reflected from the corner cube 45 through the beam splitter 43, the polarization beam splitter 41 and the polarizing plate 48 to the photodetector 51. The laser beam L4 is reflected from the corner cube 44 to the beam splitter 43 and then the laser beam L4 is reflected from beam splitter 43 through the polarization beam splitter 41 and the polarizing plate 49 to the photodetector 52. A signal CL1 from the photodetector 50 is input to the counter 53. Similarly, a signal CL3 from the photodetector 51 is input to the counter 54, while a signal CL4 from the photodetector 52 is input to the counter 55. These counters 53 to 55 are conventional counters. The CNC unit 2 is connected to a printer 56 and a display 57.

The counters 53 to 55 of the laser length measuring machine 16 count the number of the moving interference fringes and convert such information into the distances, along X, Y and Z axes, respectively. This type of laser length measuring machine 16 is conventionally used.

Referring to FIG. 5, the servomotors 31, 30, 24 are electrically connected to the CNC unit 2 and operate according to commands from the CNC unit 2. In addition, the probe 60 of the probe unit 3 is designed to send a contact signal to the data processing unit 62. A printer 63 and a display 64 are electrically connected to the data processing unit 62. The geometrical shape of the workpiece W (see FIG. 4) can be observed in the data processing unit 62. The geometrical shape is the profile of the workpiece W, for example. The data processing unit 62 and the probe unit 3 are conventionally used for three-dimensional measuring machines. The data processing unit 62 can command the servomotors 31, 30, 24 and the actuator 61 according to a program for measuring the geometrical shape thereof.

Figure 6:
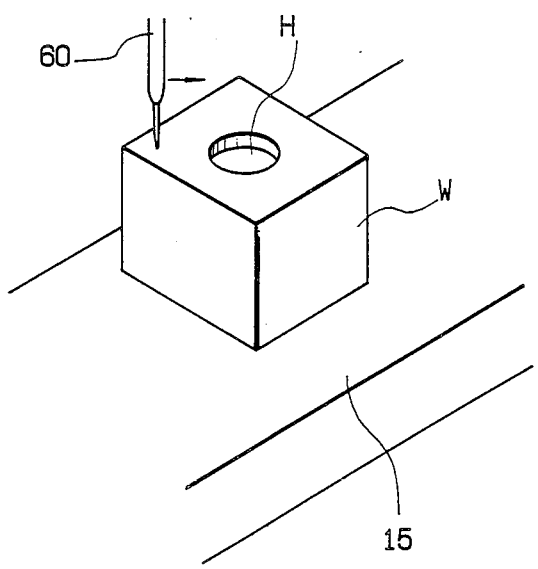
FIG. 6 is a perspective view showing a probe and a workpiece on the table.

Referring to FIG. 2, first, after the workpiece W is set on the table 15 and the endmill 23 is mounted in the spindle 20, the spindlehead 12 is moved down by operating the servomotor 24 while the endmill 23 is rotated by operating the main motor 21 to thereby produce a hole H (FIG. 6) in an upper face of the workpiece W. After producing the hole H, the spindlehead 12 (FIG. 2) is moved up to an initial predetermined position.

Next, the geometrical shape of the hole H (FIG. 6) is measured. In this case, the machined workpiece W is not removed from the table 15. In FIG. 3, the endmill 23 is removed from the spindle 20 and instead the probe unit 3 is mounted in the spindle 20. After that, a connecting line (not shown) for the probe 60 and a connecting line (not shown) for the actuator 61 are electrically connected to the data processing unit 62.

The servomotors 31, 30, 24 are operated according to the program for measuring geometrical shape from the data processing unit 62 in such a manner that the probe 60 contacts the upper face of the workpiece W and the inside of the hole H.

If the probe 60 of the probe unit 3 should come in contact with the side of the workpiece W, the probe 60 may be horizontally directed by operating the actuator 61 (FIG. 2) according to the program stored in the data processing unit 62.

The data processing unit 62 determines the geometrical shape of the workpiece W according to the distance information along the X, Y, Z-axes from each of the counters 53 to 55 and contact or non-contact information from the probe 60.

As can be seen from the foregoing, the geometrical shape of the machined workpiece W can be precisely measured immediately after the workpiece W is machined.

When machining the workpiece W, the laser length measuring apparatus 16 measures the relative distances moved between the endmill 23 and the workpiece W set on the table 15 along the X, Y and Z-axes. In addition, the probe unit 3 measures the geometrical shape of the machined workpiece W, and the laser length measuring apparatus 16 measures the relative distances moved between the endmill 23 and the workpiece W set on the table 15 along the X, Y, and Z-axes in the same manner.

This invention is not limited to the above mentioned embodiment.

The length measuring machine may be the laser length measuring machine or a linear, encoder-type length measuring machine. The machining center 1 may be a horizontal machining center or other types. The probe unit 3 may be positioned within a casing to avoid chips and dust. The probe unit 3 is preferably taken out of the casing so as to be used only when measuring.

The table and the saddles can be covered with a dust-proof cover to avoid chips and dust while the spindle and the column can be covered with a dust-proof cover to avoid chips and dust.

The machining center may be equipped with an automatic probe exchanger. The automatic probe exchanger can exchange a plurality of probes set in the spindlehead for one of the probes.

A laser light source of the laser length measuring machine may be a double-frequency mode oscillation type laser light source.

The machining center of this invention is versatile, because the machining center can not only machine a workpiece, but measure the shape of the machined workpiece.

What is claimed is:

1. A machining center comprising:
   (a) a base;
   (b) a column fixed to the base;
   (c) a spindlehead slidably mounted to the column along a first-direction and having a spindle;
   (d) a table for detachably supporting a workpiece thereon;
   (e) a first supporting means slidable along a second-direction for supporting the table;
   (f) a second supporting means slidable along a third-direction for supporting the first supporting means;
   (g) a probe means for detachably mounting in the spindle;
   (h) a first moving means for moving the spindlehead so as to cause relative motion between the probe means mounted in the spindle and the workpiece on the table along the first-direction;
   (i) a second moving means for moving the first supporting means so as to cause relative motion between the probe means mounted in the spindle and the workpiece on the table along the second-direction perpendicular to the first-direction;
   (j) a third moving means for moving the table so as to cause relative motion between the probe means mounted in the spindle and the workpiece on the table along the third-direction perpendicular to both the first-direction and the second-direction;
   (k) a laser length measuring machine for measuring distances of the relative motion between the probe means mounted in the spindle and the workpiece on the table along the first, second and third directions, the laser length measuring machine comprising;
      (1) a laser head having a laser light source and a receiving means, the laser head being fixed relative to the column;
      (2) a splitter means for splitting laser light from the laser light source into plural laser beams, the splitter means being fixed relative to the base; and
      (3) reflecting means for travelling the laser beams through the splitter means to the receiving means, respectively, by reflecting the laser beams, the reflecting means being operatively associated with each of the first, second and third-directions and being movable relative to the laser light source in response to the relative motion between the probe means and the workpiece, one of the reflecting means being positioned at the spindlehead, another of the reflecting means being positioned at the first supporting means, and a third of the reflecting means being positioned at the table;
   (l) a counter means being fixed relative to the base for counting signals from the receiving means, so as to convert the signals into distance information, along the first, second and third-directions; and
   (m) a data processing means being fixed relative to the base for observing the geometrical shape of the workpiece according to both a contact signal from the probe means and the distance information from the counter means.

2. The machining center of claim 1 wherein the laser light source is a He-Ne laser.

3. The machining center of claim 1 wherein the probe means comprises a probe for generating the contact signal by contact with the workpiece and an actuator for the attitude control of the probe.

4. The machining center of claim 1 wherein the probe means comprises a probe for generating the contact signal by contact with the workpiece, an actuator for the attitude control of the probe, and an inserting portion for mounting in a spindle.

5. The machining center of claim 3 wherein the probe is directed along a direction parallel to the first direction so that the probe can contact the upper face of the workpiece.

6. The machining center of claim 3 wherein the probe is directed along a direction perpendicular to the first direction by the actuator so that the probe can contact the side face of the workpiece.

7. The machining center of claim 3 wherein the probe is directed by operating the actuator according to program stored in a data processing means.

8. The machining center of claim 1 wherein the first, second and third moving means are controlled by the data processing means and a numerical control unit.

9. The machining center of claim 1 wherein the splitter means are polarization beam splitters.

10. The machining center of claim 4 wherein the probe is directed along a direction parallel to the first direction so that the probe can contact the upper face of the workpiece.

11. The machining center of claim 4 wherein the probe is directed along a direction perpendicular to the first direction by the actuator so that the probe can contact the side face of the workpiece.

12. The machining center of claim 4 wherein the probe is directed by operating the actuator according to program stored in a data processing means.

* * * * *